United States Patent
Lin et al.

(10) Patent No.: US 9,293,034 B2
(45) Date of Patent: Mar. 22, 2016

(54) POWER-SAVING REMOTE CONTROL APPARATUS AND POWER-SAVING MANUAL CONTROL APPARATUS

(71) Applicant: TIMOTION TECHNOLOGY CO., LTD., New Taipei (TW)

(72) Inventors: Dong-Jye Lin, New Taipei (TW); Pei-Yu Chen, New Taipei (TW); Ching-Wen Wu, New Taipei (TW)

(73) Assignee: Timotion Technology Co., Ltd., New Taipei (TW)

( * ) Notice: Subject to any disclaimer, the term of this patent is extended or adjusted under 35 U.S.C. 154(b) by 173 days.

(21) Appl. No.: 14/144,405

(22) Filed: Dec. 30, 2013

(65) Prior Publication Data

US 2014/0191854 A1 Jul. 10, 2014

(30) Foreign Application Priority Data

Jan. 10, 2013 (TW) .............................. 102200566 U
Dec. 4, 2013 (TW) .............................. 102222816 U

(51) Int. Cl.
| | |
|---|---|
| G05B 11/01 | (2006.01) |
| G08B 21/00 | (2006.01) |
| G08C 17/02 | (2006.01) |
| H02J 9/00 | (2006.01) |

(52) U.S. Cl.
CPC .................. *G08C 17/02* (2013.01); *H02J 9/005* (2013.01); *G05B 2219/23051* (2013.01); *G08C 2201/10* (2013.01); *G08C 2201/21* (2013.01)

(58) Field of Classification Search
CPC ............... G08C 17/02; G08C 2201/92; G08C 2201/21; G08C 2201/41; G08C 2201/42; H02J 9/005; H04M 1/72533; H04M 2250/22; G05B 2219/23051; G05B 2219/25289; H04N 21/42207; H04N 5/4403; H04N 21/4436; G04G 21/00; H04B 1/202
USPC ............ 340/12.22, 13.22, 7.22, 693.1, 693.3, 340/636.1, 3.1; 348/734, E05.096; 345/211, 345/156, 530
See application file for complete search history.

(56) References Cited

U.S. PATENT DOCUMENTS

2007/0271513 A1* 11/2007 Andren ................ G04G 9/0064
715/703
2008/0165024 A1* 7/2008 Gretton .............. G01C 21/3655
340/4.31

(Continued)

FOREIGN PATENT DOCUMENTS

EP 1 231 698 A2 8/2002

*Primary Examiner* — Mirza Alam
(74) *Attorney, Agent, or Firm* — Muncy, Geissler, Olds & Lowe, P.C.

(57) ABSTRACT

A power-saving remote control apparatus (40) includes a remote control receiving unit (1022) and a main control unit (104). The main control unit (104) is configured to control the power-saving remote control apparatus (40) to enter a working mode when a controlled apparatus (30) needs to be turned on. The main control unit (104) is configured to control the power-saving remote control apparatus (40) to enter a sleeping-power-saving mode when the controlled apparatus (30) stops working, and then for every first predetermined time, the main control unit (104) is turned on to wake up the remote control receiving unit (1022) to scan a plurality of wireless signals (52). The main control unit (104) is configured to control the power-saving remote control apparatus (40) to enter the working mode if the wireless signals (52) include a wireless starting signal (54) for starting the controlled apparatus (30).

10 Claims, 3 Drawing Sheets

(56) References Cited

U.S. PATENT DOCUMENTS

| | | | |
|---|---|---|---|
| 2009/0128714 A1* | 5/2009 | Taya | G08C 17/00 348/734 |
| 2010/0052925 A1* | 3/2010 | Hirabayashi | G05B 19/042 340/636.1 |
| 2011/0153032 A1* | 6/2011 | Klok | G08C 17/02 700/12 |
| 2012/0139348 A1 | 6/2012 | DuBose | |
| 2014/0036159 A1* | 2/2014 | Jung | H04N 5/4403 348/734 |

* cited by examiner

POWER-SAVING REMOTE CONTROL APPARATUS AND POWER-SAVING MANUAL CONTROL APPARATUS

BACKGROUND OF THE INVENTION

1. Field of the Invention

The present invention relates to a remote control apparatus and a manual control apparatus, and especially relates to a power-saving remote control apparatus and a power-saving manual control apparatus.

2. Description of the Related Art

A remote control apparatus is used for turning on/off or controlling an external electronic apparatus. A related art remote control apparatus usually includes a plurality of operation keys or buttons. A user can press the operation keys or buttons for turning on/off or controlling the external electronic apparatus.

However, the related art remote control apparatus cannot save power effectively. The related art remote control apparatus cannot enter the standby mode for saving power when the related art remote control apparatus is not used (or is idled).

A manual control apparatus is similar to the remote control apparatus. The manual control apparatus is used for turning on/off or controlling the external electronic apparatus. A related art manual control apparatus usually includes a plurality of operation keys or buttons. The user can press the operation keys or buttons for turning on/off or controlling the external electronic apparatus.

However, the related art manual control apparatus cannot save power effectively. The related art manual control apparatus cannot enter the standby mode for saving power when the related art manual control apparatus is not used (or is idled).

SUMMARY OF THE INVENTION

In order to solve the above-mentioned problems, an object of the present invention is to provide a power-saving remote control apparatus.

In order to solve the above-mentioned problems, another object of the present invention is to provide a power-saving manual control apparatus.

In order to achieve the object of the present invention mentioned above, the power-saving remote control apparatus is applied to an alternating current power supply and a controlled apparatus. The power-saving remote control apparatus includes a remote control receiving unit, a main control unit, a main power unit, a switch unit, a standby awakening unit and a standby power unit. The main control unit is electrically connected to the remote control receiving unit and the controlled apparatus. The main power unit is electrically connected to the controlled apparatus. The switch unit is electrically connected to the alternating current power supply and the main power unit. The standby awakening unit is electrically connected to the main control unit and the switch unit. The standby power unit is electrically connected to the alternating current power supply, the switch unit, the standby awakening unit, the remote control receiving unit and the main control unit. Moreover, the main control unit detects and is configured to control the power-saving remote control apparatus to enter a working mode when the controlled apparatus needs to be turned on. Then, the main control unit is configured to control the standby awakening unit to turn on the switch unit. The main power unit converts an alternating current power from the alternating current power supply into a driving power. The main power unit sends the driving power to the controlled apparatus to start the controlled apparatus. Moreover, the main control unit detects and is configured to control the power-saving remote control apparatus to enter a sleeping-power-saving mode when the controlled apparatus stops working. Then, the main control unit is configured to control the standby awakening unit to turn off the switch unit, so that the main power unit, the standby awakening unit, the main control unit and the remote control receiving unit stop working. Moreover, when the power-saving remote control apparatus is in the sleeping-power-saving mode, the standby power unit receives the alternating current power to supply power to the standby awakening unit, the main control unit and the remote control receiving unit. Then, every first predetermined time, the main control unit is turned on to wake up the remote control receiving unit to detect and scan a plurality of wireless signals with a scan duration of a second predetermined time. The main control unit is configured to control the power-saving remote control apparatus to enter the working mode if the wireless signals include a wireless starting signal for starting the controlled apparatus.

Moreover, the remote control receiving unit is, for example but not limited to, a wireless signal receiver. The main control unit is, for example but not limited to, a main controller. The main power unit is, for example but not limited to, a main power supply circuit. The switch unit is, for example but not limited to, a relay. The standby awakening unit is, for example but not limited to, a standby awakening circuit. The standby power unit is, for example but not limited to, a standby power supply circuit. A power consumption of the power-saving remote control apparatus is less than 1 watt when the power-saving remote control apparatus is in the sleeping-power-saving mode.

In order to achieve another object of the present invention mentioned above, the power-saving manual control apparatus is applied to an alternating current power supply and a controlled apparatus. The power-saving manual control apparatus is electrically connected to the alternating current power supply and the controlled apparatus. The power-saving manual control apparatus includes a manual control unit, a main control unit, a main power unit, a switch unit, a standby awakening unit and a standby power unit. The manual control unit is electrically connected to the controlled apparatus. The main control unit is electrically connected to the manual control unit. The main power unit is electrically connected to the main control unit. The switch unit is electrically connected to the alternating current power supply and the main power unit. The standby awakening unit is electrically connected to the manual control unit, the main control unit and the switch unit. The standby power unit is electrically connected to the alternating current power supply, the switch unit, the standby awakening unit and the manual control unit. The manual control unit informs the standby awakening unit to turn on the switch unit when the manual control unit is operated. Then, the main power unit receives an alternating current power from the alternating current power supply. The main power unit converts the alternating current power into a direct current power and sends the direct current power to the main control unit. The main control unit detects and informs the standby awakening unit to turn off the switch unit when the manual control unit has not been operated for a predetermined time. Then, the main power unit does not receive the alternating current power from the alternating current power supply. The main power unit does not send the direct current power to the main control unit. Then, the standby power unit receives the alternating current power from the alternating current power supply to convert and supply power to the standby awakening unit and the manual control unit.

Moreover, the manual control unit is, for example but not limited to, a manual controller. The main control unit is, for example but not limited to, a main controller. The main power unit is, for example but not limited to, a main power supply circuit. The switch unit is, for example but not limited to, a relay. The standby awakening unit is, for example but not limited to, a standby awakening circuit. The standby power unit is, for example but not limited to, a standby power supply circuit. The manual control unit is, for example but not limited to, a touch switch. A standby power consumption of the power-saving manual control apparatus is less than 1 watt.

The efficiency of the present invention is to provide a remote control apparatus and a manual control apparatus that can save power effectively.

DETAILED DESCRIPTION OF THE INVENTION

Figure 1:
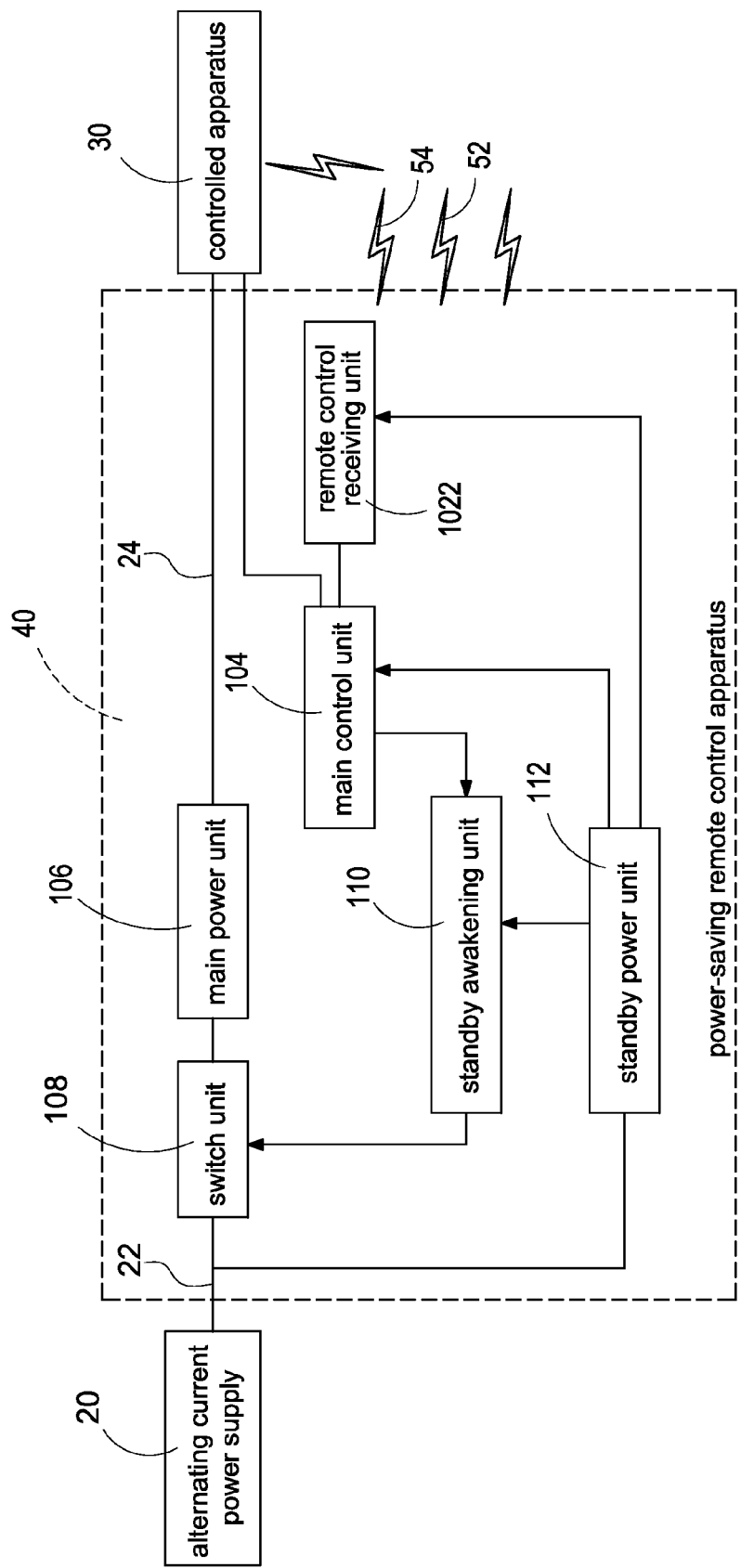
FIG. 1 shows a block diagram of the power-saving remote control apparatus of the present invention.

FIG. 1 shows a block diagram of the power-saving remote control apparatus of the present invention. A power-saving remote control apparatus 40 is applied to an alternating current power supply 20 and a controlled apparatus 30 (namely, apparatus under control), which is to be controlled. The power-saving remote control apparatus 40 includes a remote control receiving unit 1022, a main control unit 104, a main power unit 106, a switch unit 108, a standby awakening unit 110 and a standby power unit 112.

The main control unit 104 is electrically connected to the remote control receiving unit 1022 and the controlled apparatus 30. The main power unit 106 is electrically connected to the controlled apparatus 30. The switch unit 108 is electrically connected to the alternating current power supply 20 and the main power unit 106. The standby awakening unit 110 is electrically connected to the main control unit 104 and the switch unit 108. The standby power unit 112 is electrically connected to the alternating current power supply 20, the switch unit 108, the standby awakening unit 110, the remote control receiving unit 1022 and the main control unit 104.

Moreover, the main control unit 104 is configured to detect when the controlled apparatus 30 needs to be turned on, and configured to control the power-saving remote control apparatus 40 to enter a working mode if the controlled apparatus 30 needs to be turned on. Then, the main control unit 104 is configured to control the standby awakening unit 110 to turn on the switch unit 108. The main power unit 106 converts an alternating current power 22 from the alternating current power supply 20 into a driving power 24. The main power unit 106 sends the driving power 24 to the controlled apparatus 30 to start the controlled apparatus 30.

Moreover, the main control unit 104 is configured to detect when the controlled apparatus 30 needs to stop working and configured to control the power-saving remote control apparatus 40 to enter a sleeping-power-saving mode if the controlled apparatus 30 needs to stop working. Then, the main control unit 104 is configured to control the standby awakening unit 110 to turn off the switch unit 108, so that the main power unit 106, the standby awakening unit 110, the main control unit 104 and the remote control receiving unit 1022 stop working.

Figure 2:
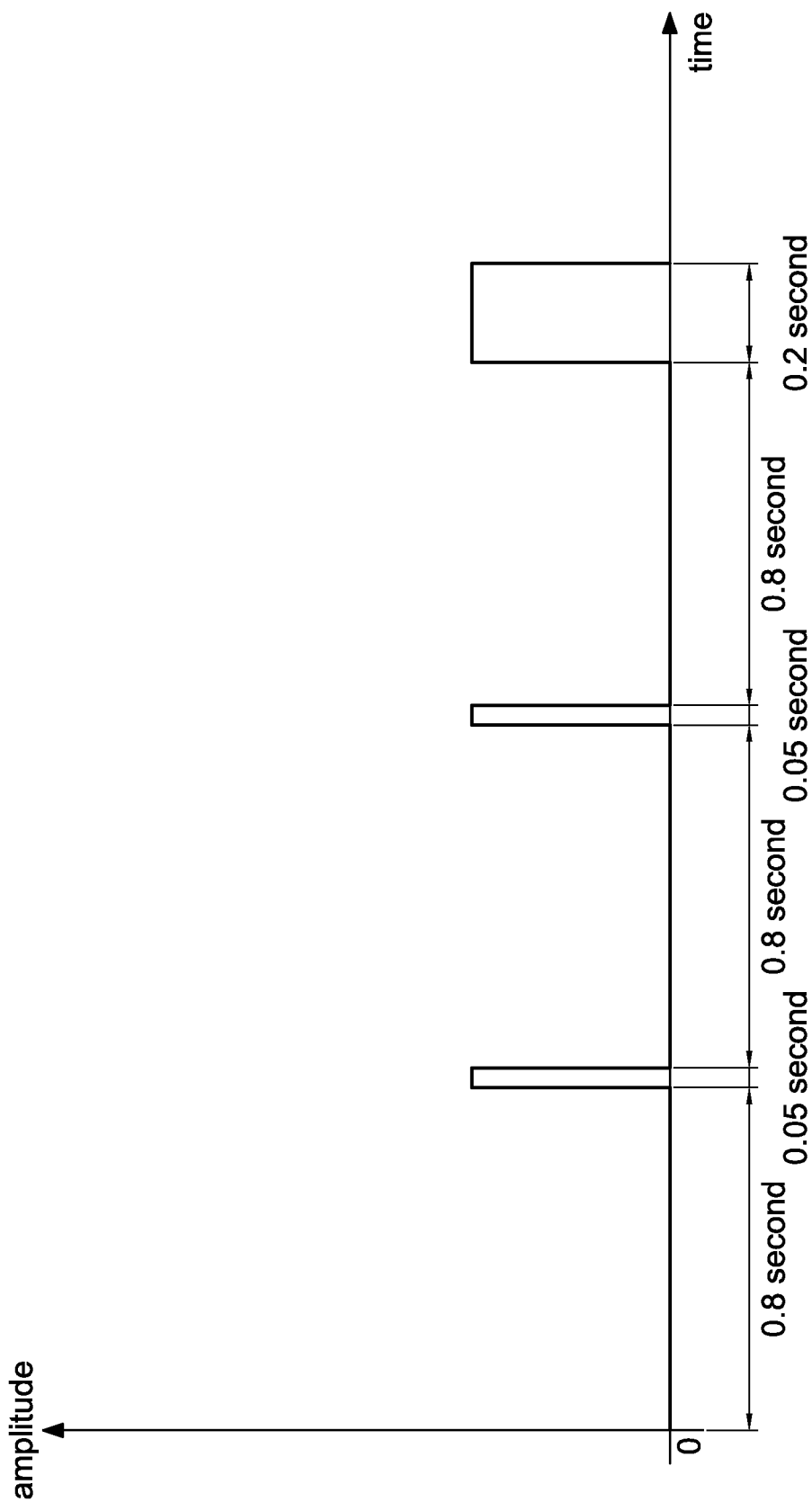
FIG. 2 shows a waveform diagram of an embodiment of the present invention.

FIG. 2 shows a waveform diagram of an embodiment of the present invention. Moreover, when the power-saving remote control apparatus 40 is in the sleeping-power-saving mode, the standby power unit 112 receives the alternating current power 22 to supply power to the standby awakening unit 110, the main control unit 104 and the remote control receiving unit 1022. Then, every first predetermined time (for example, 0.8 second as shown in FIG. 2), the main control unit 104 is turned on (for example, the main control unit 104 is turned on by an oscillator inside the main control unit 104) to wake up the remote control receiving unit 1022 to detect and scan a plurality of wireless signals 52 (in the air) with a scan duration of a second predetermined time (for example, 0.05 second as shown in FIG. 2, namely the main control unit 104 is turned on 0.05 second for scanning). The main control unit 104 is configured to control the power-saving remote control apparatus 40 to enter the working mode if the wireless signals 52 include a wireless starting signal 54 for starting the controlled apparatus 30.

Moreover, the second predetermined time will be prolonged (for example, 0.2 second as shown in FIG. 2) to ensure the existence of the wireless starting signal 54 if the wireless signals 52 are found to include the wireless starting signal 54, wherein the wireless signals 52 and the wireless starting signal 54 are sent from a remote controller (not shown). The power-saving remote control apparatus 40 will enter the sleeping-power-saving mode if the wireless signals 52 are found to not include the wireless starting signal 54. Then, every first predetermined time, the main control unit 104 is turned on to wake up the remote control receiving unit 1022.

Moreover, the remote control receiving unit 1022 is, for example but not limited to, a wireless signal receiver. The main control unit 104 is, for example but not limited to, a main controller. The main power unit 106 is, for example but not limited to, a main power supply circuit. The switch unit 108 is, for example but not limited to, a relay. The standby awakening unit 110 is, for example but not limited to, a standby awakening circuit. The standby power unit 112 is, for example but not limited to, a standby power supply circuit. The controlled apparatus 30 is, for example but not limited to, a motor.

The advantage of the present invention is to provide a remote control apparatus that can save power effectively. A power consumption of the power-saving remote control apparatus 40 is less than 1 watt when the power-saving remote control apparatus 40 is in the sleeping-power-saving mode.

Figure 3:
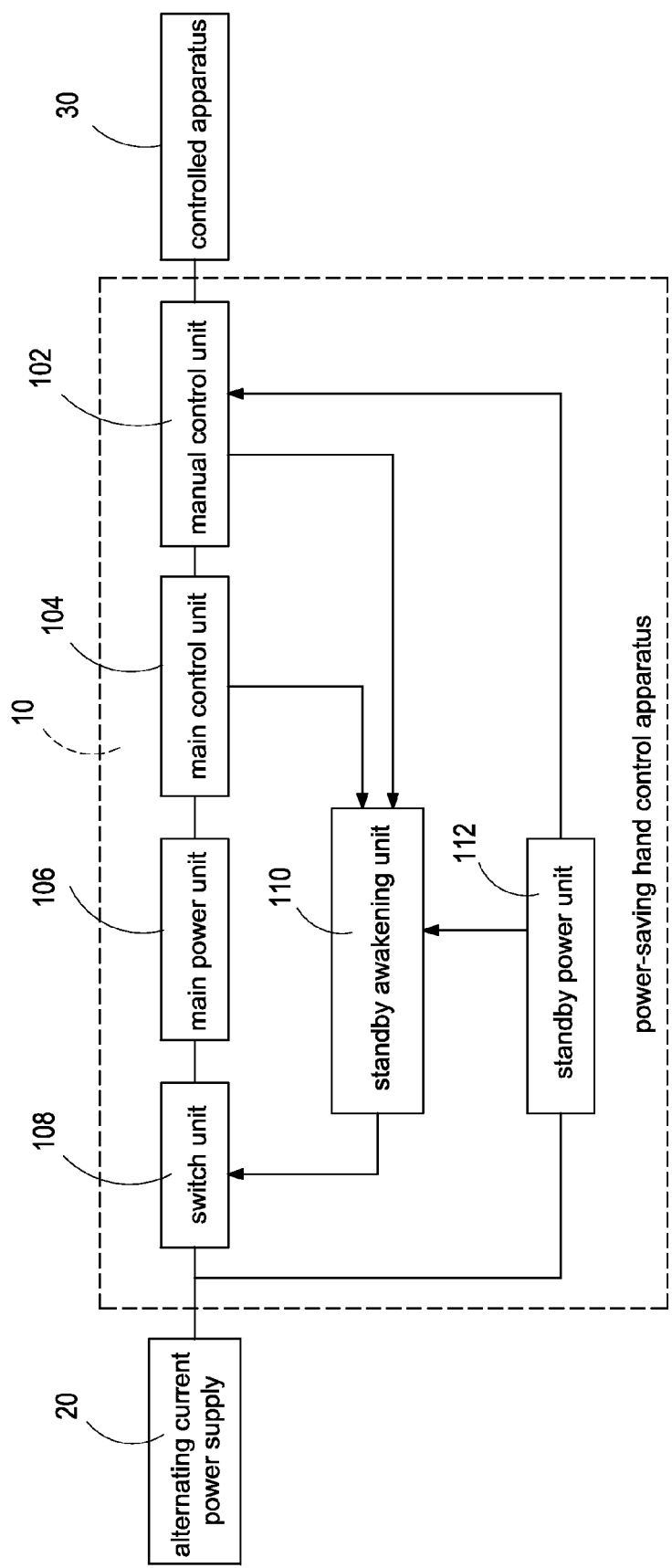
FIG. 3 shows a block diagram of the power-saving manual control apparatus of the present invention.

FIG. 3 shows a block diagram of the power-saving manual control apparatus of the present invention. A power-saving manual control apparatus 10 is applied to an alternating current power supply 20 and a controlled apparatus 30. The power-saving manual control apparatus 10 is electrically connected to the alternating current power supply 20 and the controlled apparatus 30.

The power-saving manual control apparatus 10 includes a manual control unit 102, a main control unit 104, a main power unit 106, a switch unit 108, a standby awakening unit 110 and a standby power unit 112.

The manual control unit 102 is electrically connected to the controlled apparatus 30. The main control unit 104 is electrically connected to the manual control unit 102. The main power unit 106 is electrically connected to the main control unit 104. The switch unit 108 is electrically connected to the alternating current power supply 20 and the main power unit 106. The standby awakening unit 110 is electrically connected to the manual control unit 102, the main control unit 104 and the switch unit 108. The standby power unit 112 is electrically connected to the alternating current power supply 20, the switch unit 108, the standby awakening unit 110 and the manual control unit 102.

The manual control unit 102 informs the standby awakening unit 110 to turn on the switch unit 108 when the manual control unit 102 is operated (for examples, buttons on the manual control unit 102 are pressed by a user or touch switches on the manual control unit 102 are touched by the user). Then, the main power unit 106 receives an alternating current power (not shown in FIG. 3) from the alternating current power supply 20. The main power unit 106 converts the alternating current power into a direct current power (not shown in FIG. 3, for example, 30 volts) and sends the direct current power to the main control unit 104 and other related circuits. The main control unit 104 detects that the manual control unit 102 has not been operated for a predetermined time (for examples, the buttons on the manual control unit 102 have not been detected to press during a detection duration of 10 seconds or the touch switches on the manual control unit 102 have not been detected to touch during a detection duration of 10 seconds) and informs the standby awakening unit 110 to turn off the switch unit 108. Then, the main power unit 106 does not receive the alternating current power from the alternating current power supply 20. The main power unit 106 does not send the direct current power to the main control unit 104 and other related circuits. In other word, the power-saving manual control apparatus 10 enters a standby mode. Then, the standby power unit 112 receives the alternating current power from the alternating current power supply 20 to convert and supply power (for example, 5 volts) to the standby awakening unit 110 and the manual control unit 102. Therefore, the standby power unit 112 is not a conventional transformer-based power or battery (The standby power unit 112 is, for example, a switching power supply). The standby power unit 112 receives the alternating current power from the alternating current power supply 20 to convert and supply power to the standby awakening unit 110 and the manual control unit 102, so that the manual control unit 102 can continuously detect whether the manual control unit 102 is operated or not in the standby mode. A standby power consumption of the power-saving manual control apparatus 10 is very small, for example, less than 1 watt.

Moreover, the manual control unit 102 is, for example but not limited to, a manual controller. The main control unit 104 is, for example but not limited to, a main controller. The main power unit 106 is, for example but not limited to, a main power supply circuit. The switch unit 108 is, for example but not limited to, a relay. The standby awakening unit 110 is, for example but not limited to, a standby awakening circuit. The standby power unit 112 is, for example but not limited to, a standby power supply circuit. The present invention is applied to, for example but not limited to, a manual control apparatus for a push rod. The manual control unit 102 is, for example but not limited to, a touch switch.

The advantage of the present invention is to provide a manual control apparatus that can save power effectively.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power-saving remote control apparatus connected to an alternating current power supply and a controlled apparatus, the power-saving remote control apparatus comprising:
   a remote control receiving unit;
   a main control unit electrically connected to the remote control receiving unit and the controlled apparatus;
   a main power unit electrically connected to the controlled apparatus;
   a switch unit electrically connected to the alternating current power supply and the main power unit;
   a standby awakening unit electrically connected to the main control unit and the switch unit; and
   a standby power unit electrically connected to the alternating current power supply, the switch unit, the standby awakening unit, the remote control receiving unit and the main control unit,
   wherein the main control unit is configured to control the power-saving remote control apparatus to enter a working mode; then the main control unit is configured to control the standby awakening unit to turn on the switch unit; the main power unit converts an alternating current power from the alternating current power supply into a driving power; the main power unit sends the driving power to the controlled apparatus to start the controlled apparatus;
   wherein the main control unit is configured to control the power-saving remote control apparatus to enter a sleeping-power-saving mode when the controlled apparatus stops working; then the main control unit is configured to control the standby awakening unit to turn off the switch unit, so that the main power unit, the standby awakening unit, the main control unit and the remote control receiving unit stop working;
   wherein the standby power unit receives the alternating current power to supply power to the standby awakening unit, the main control unit and the remote control receiving unit when the power-saving remote control apparatus is in the sleeping-power-saving mode;
   wherein for every first predetermined time, the main control unit is turned on to wake up the remote control receiving unit to scan a plurality of wireless signals for a duration of a second predetermined time; the main control unit is configured to control the power-saving remote control apparatus to enter the working mode if the wireless signals include a wireless starting signal for starting the controlled apparatus.

2. The power-saving remote control apparatus in claim 1, wherein the remote control receiving unit is a wireless signal receiver.

3. The power-saving remote control apparatus in claim 2, wherein the main control unit is a main controller.

4. The power-saving remote control apparatus in claim 3, wherein the main power unit is a main power supply circuit; the switch unit is a relay.

5. The power-saving remote control apparatus in claim 4, wherein the standby awakening unit is a standby awakening circuit; the standby power unit is a standby power supply circuit; a power consumption of the power-saving remote control apparatus is less than 1 watt when the power-saving remote control apparatus is in the sleeping-power-saving mode.

6. A power-saving manual control apparatus connected to an alternating current power supply and a controlled apparatus, the power saving manual control apparatus electrically connected to the alternating current power supply and the controlled apparatus, the power-saving manual control apparatus comprising:

a manual control unit electrically connected to the controlled apparatus;

a main control unit electrically connected to the manual control unit;

a main power unit electrically connected to the main control unit;

a switch unit electrically connected to the alternating current power supply and the main power unit;

a standby awakening unit electrically connected to the manual control unit, the main control unit and the switch unit; and a standby power unit electrically connected to the alternating current power supply, the switch unit, the standby awakening unit and the manual control unit, wherein the manual control unit informs the standby awakening unit to turn on the switch unit when the manual control unit is operated; then, the main power unit receives an alternating current power from the alternating current power supply; the main power unit converts the alternating current power into a direct current power and sends the direct current power to the main control unit;

wherein the main control unit informs the standby awakening unit to turn off the switch unit when the manual control unit has not been operated for a duration of a predetermined time; then, the main power unit does not receive the alternating current power from the alternating current power supply and the main power unit does not send the direct current power to the main control unit; then the standby power unit receives the alternating current power from the alternating current power supply to convert and supply power to the standby awakening unit and the manual control unit;

wherein for every first predetermined time, the main control unit is turned on to wake up a remote control receiving unit to scan a plurality of wireless signals for a duration of a second predetermined time; the main control unit is configured to control a power-saving remote control apparatus to enter the working mode if the wireless starting signals include a wireless starting signal for starting the controlled apparatus.

7. The power-saving manual control apparatus in claim 6, wherein the manual control unit is a manual controller; the main control unit is a main controller.

8. The power-saving manual control apparatus in claim 7, wherein the main power unit is a main power supply circuit; the switch unit is a relay.

9. The power-saving manual control apparatus in claim 8, wherein the standby awakening unit is a standby awakening circuit; the standby power unit is a standby power supply circuit.

10. The power-saving manual control apparatus in claim 6, wherein the manual control unit is a touch switch; a standby power consumption of the power-saving manual control apparatus is less than 1 watt.

\* \* \* \* \*